United States Patent
Wnuk et al.

(10) Patent No.: US 10,029,194 B2
(45) Date of Patent: Jul. 24, 2018

(54) FILTER DEVICE

(75) Inventors: Ralf Wnuk, Kleinottweiler (DE);
Thomas Böttcher, Illingen-Hüttigweiler (DE); Markus Olschok, Neunkirchen (DE); Jörg Hermann Gerstner, Püttlingen (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 427 days.

(21) Appl. No.: 13/261,665

(22) PCT Filed: Oct. 19, 2011

(86) PCT No.: PCT/EP2011/005251
§ 371 (c)(1),
(2), (4) Date: Jul. 18, 2013

(87) PCT Pub. No.: WO2012/079661
PCT Pub. Date: Jun. 21, 2012

(65) Prior Publication Data
US 2013/0292321 A1    Nov. 7, 2013

(30) Foreign Application Priority Data
Dec. 16, 2010 (DE) .......................... 10 2010 054 716

(51) Int. Cl.
    *B01D 29/68*      (2006.01)
    *B01D 29/48*      (2006.01)
    (Continued)

(52) U.S. Cl.
    CPC ............. *B01D 29/68* (2013.01); *B01D 29/48* (2013.01); *B01D 29/52* (2013.01); *B01D 29/606* (2013.01);
(Continued)

(58) Field of Classification Search
None
See application file for complete search history.

(56) References Cited

U.S. PATENT DOCUMENTS 2,721,580 A * 10/1955 Greer .............................. 138/30
3,445,002 A    5/1969 Muller
(Continued)

FOREIGN PATENT DOCUMENTS

DE      40 30 084 A1    3/1992
DE      4030084 A1 * 3/1992 ............. B01D 29/17
(Continued)

OTHER PUBLICATIONS

NPL-1 ("Hydraulic Piston Accumulators", Hydac) publication date:Dec. 8, 2005 http://www.hydac.com/au/MessageForceWebsite/Sites/279/Files/PistonAccumulators.pdf.*
(Continued)

*Primary Examiner* — Bobby Ramdhanie
*Assistant Examiner* — Michael J An
(74) *Attorney, Agent, or Firm* — Wenderoth, Lind & Ponack, L.L.P.

(57) ABSTRACT

A filter device includes at least one filter housing (1) in which at least one filter element (21) is arranged. Inside the filter housing (1), the filter element separates a clean side (9) from an untreated side (13). On the clean side (9) of the filter housing (1) at least one storage unit (3) having at least one movable separating element (47) is connected. The separating element divides the storage unit (3) into two working chambers or pressure chambers (49) (43).

14 Claims, 2 Drawing Sheets

(51) Int. Cl.
  *B01D 29/52* (2006.01)
  *B01D 29/60* (2006.01)
  *B01D 29/66* (2006.01)
  *B01D 29/90* (2006.01)

(52) U.S. Cl.
  CPC ......... *B01D 29/665* (2013.01); *B01D 29/668* (2013.01); *B01D 29/90* (2013.01)

(56) References Cited

U.S. PATENT DOCUMENTS

| | | | | |
|---|---|---|---|---|
| 4,967,553 | A | * | 11/1990 | Barthomeuf .................... 60/371 |
| 5,348,647 | A | | 9/1994 | Chen |
| 5,882,528 | A | * | 3/1999 | Davidson ............... B01D 29/21 |
| | | | | 210/167.13 |
| 2006/0175270 | A1 | * | 8/2006 | Greene ................. B01D 29/66 |
| | | | | 210/798 |
| 2007/0158261 | A1 | * | 7/2007 | Wnuk .................... B01D 29/48 |
| | | | | 210/333.01 |
| 2008/0067119 | A1 | * | 3/2008 | Wnuk .................... B01D 29/52 |
| | | | | 210/170.11 |

FOREIGN PATENT DOCUMENTS

| | | | | |
|---|---|---|---|---|
| DE | 19956859 | * | 6/2001 | ............. B01D 46/24 |
| DE | 10 2004 037 280 A1 | | 3/2006 | |
| DE | 102004037280 | * | 8/2006 | ............. B01D 29/68 |
| DE | 102007054737 | * | 5/2009 | ............. B01D 29/68 |
| GB | 1 037 837 A | | 8/1966 | |

OTHER PUBLICATIONS

NPL-2 ("Piston Maintanance Manual", Hydac) publication date: May 2, 2010 http://www.hydac-na.com/sites/hydac-na/SiteCollectionDocuments/Piston%20Maintenance%Manual.pdf.*
Machine Translation of DE 4030084, pp. 1-11.*

* cited by examiner

US 10,029,194 B2

FILTER DEVICE

FIELD OF THE INVENTION

The invention relates to a filter device comprising at least one filter housing in which at least one filter element is disposed that separates the clean side from the untreated side inside the filter housing.

BACKGROUND OF THE INVENTION

Filter devices of this kind are used in a great number of the most varied applications, as well as in the filtration of different fluids. Different constructions of the device are possible, depending on the area of application. Among the preferred applications is the purification of fluids, lubricants or fuels. Similarly, such devices can be used for water purification, or in connection with different kinds of process or operating fluids.

Irrespective of varying constructions and the great variability applications, as a common requirement, all of these filter devices must be able to ensure the uninterrupted operation of the connected system that is to be supplied with the filtrate.

SUMMARY OF THE INVENTION

An object of the present invention to provide a filter device with operational properties that are especially suited to meet these requirements.

According to the invention, this object is basically achieved by a filter device where an essential special aspect of the invention provides that at least one storage unit is connected on the clean side of the filter housing that includes a separating element, which separating element is movable between two working or pressure chambers. This way, the operation of the device can be easily supported by a pressure control that influences the pressure level on the clean side inside the filter housing, providing an adjustment to the respective operating state. For example, during normal filtration operation, pressure variations can be compensated for due to volume changes in the space of the storage unit that is connected to the filter housing (pulsation dampening). Fluctuations of the volume flow of the discharged filtrate are then avoided. Similarly, if necessary, the filtration process can be supported by a suction effect of the storage unit. In filter devices that are provided with a backwashing mechanism, advantageously a drop in the volume flow of the filtrate can be avoided due to volume compensation by the storage unit, as would be caused to occur with the start of a backwashing process by a secondary flow of the backwashing volume, and/or to support the backwashing by applying pressure to the clean side of the device.

DE 199 56 859 A 1 discloses a backwashing filter device that, during backwashing processes, discharges a backwashing volume of fluid from the filter housing and that can be connected to a negative pressure source. The negative pressure source can be activated to generate negative pressure at a respective filter element that is to be backwashed. The negative pressure source includes a suction pump that is constructed in the manner of a diaphragm accumulator having a diaphragm that can be deflected for pumping motions by a mechanic drive. Although the known solution can increase the intensity of the backwashing operation, the increase of the backwashing volume, however, that is generated by the suction action, results in an increased drop in the volume flow of the filtrate due to secondary flow.

In especially advantageous embodiments of the invention, the space of the storage unit, which is separated by the separating element from the fluid chamber that is connected to the clean side of the filter housing, constitutes a working chamber that can be connected to a source for a pressure medium. By a corresponding application of pressure to the working chamber, the operating state of the storage unit can be controlled along with, the influence thereof on the filtration or backwashing operation. Particularly advantageously, a hydro-pneumatic pressure accumulator as a storage unit having a working chamber can be connected to a pressure source, particularly a compressed air source.

In especially preferred embodiments, a pressure accumulator is provided in the form of a piston accumulator.

If the filter device according to the invention is configured as a backwashing device, the arrangement can be especially advantageously designed such that the filter housing constitutes a cylindrical internal chamber that has filter cartridges that can accommodate through-flow in both directions for filtration or backwashing operations. At least one filter element is backwashed by a backwashing device for cleaning the effective filter surface while, simultaneously, the other filter elements accommodate flow-through from the outside to the inside for the purpose of the filtration. The internal chamber of the filter housing surrounding the filter elements then constitutes the clean side that is connected to the fluid chamber of the pressure accumulator.

In backwashing filter devices of this kind, the internal chamber of the filter housing can be open at the top end thereof transitioning into the cylinder chamber of the piston accumulator provided as pressure accumulator. The accumulator is disposed coaxially relative to the vertical axis on the filter housing and constitutes the fluid side. Aside from the advantage of the especially compact construction, the further advantage is that the operation of the storage unit is not associated with any losses in flow because the filter housing immediately transitions into the fluid chamber of the pressure accumulator.

In especially preferred embodiments, the opening of the upper end of the internal chamber of the filter housing extends over the entire inside diameter thereof. The diameter of the immediately following cylinder chamber of the piston accumulator has at least the size of the diameter of the internal chamber of the filter housing. The transition of the filter housing into the piston accumulator is therefore virtually step-free.

Especially advantageously the cylinder jacket of the piston accumulator crosses over the open top end of the filter housing, has an internal thread and is screwed together with the external thread of the filter housing. Correspondingly, the housing and piston accumulator form an especially compact structural unit.

Regarding the operating behavior, particularly during the backwashing operation, the largest value of the volume of the fluid side of the pressure accumulator is preferably equal to or greater than the volume of the internal chamber of the filter housing surrounding the filter elements. A sufficiently large volume of the filtrate is therefore available in the storage unit to compensate the volume flow of the backwashing quantity to thereby maintain a constant volume flow of the discharged filtrate during a backwashing process.

The arrangement regarding the backwashing device can be selected such that it includes a backwashing valve in the backwashing line. The backwashing line is connected to the untreated side of the filter element that is to be backwashed, and that can be opened for backwashing processes. A valve is connected to the working chamber of the pressure accumulator and can be triggered as a function of time and actuation of the backwashing valve to supply compressed air into the working chamber or discharge compressed air from the working chamber of the pressure accumulator.

In a preferred embodiment of the construction of the filter device, the filter elements are disposed sequentially having the ability to pivot around the vertical axis. The pivoting is achieved by a pivot device that includes a rotary drive, and is from their filtration position into a backwashing position that is aligned with the backwashing line, and then back to the filtration position.

The filter elements can be provided in the form of tapered slotted screen tube elements.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
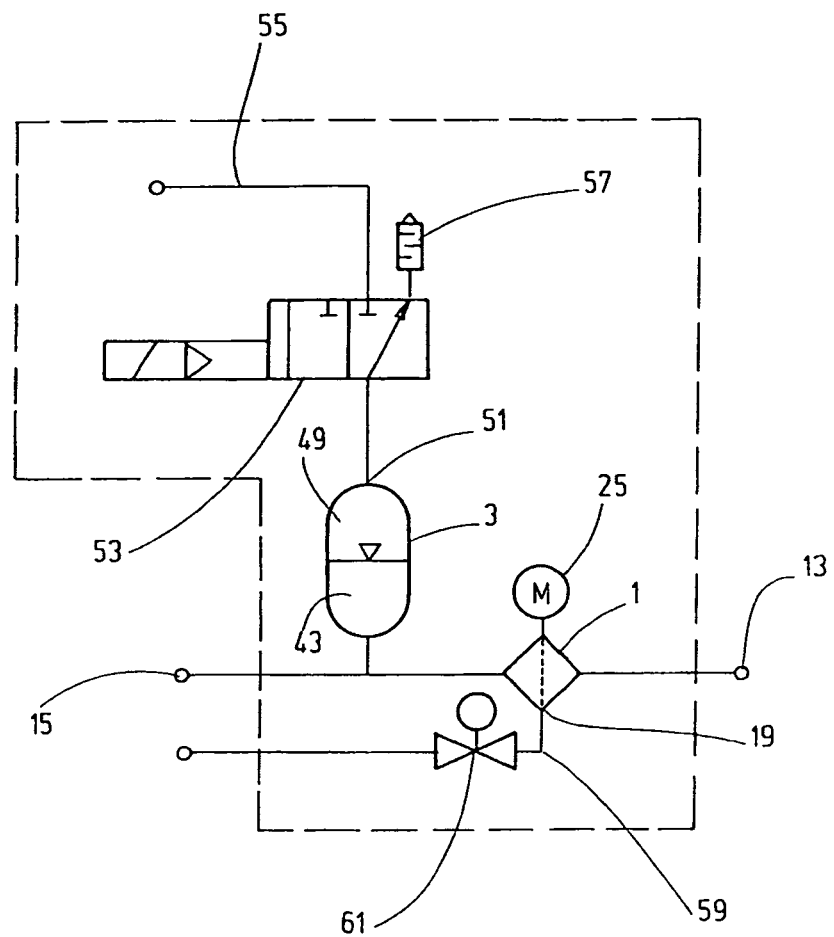
FIG. 1 is a symbolic diagram of a hydraulic circuit of a filter device according to an exemplary embodiment of the invention in the form of a backwashing filter device.

The filter device according to the invention will be explained in further detail using the example of a backwashing filter device. The device comprises a filter housing 1 (FIG. 2) as well as a storage unit that is a piston accumulator 3 in the depicted embodiment. The filter housing 1 is designed in two parts and includes a housing bottom part 5 and a housing top part 7 that are screwed together forming a seal. The hollow-cylindrical housing top part 7 defines, in conjunction with the housing bottom part 5, an internal housing chamber 9 in the shape of a hollow cylinder that is open at the top end 11 thereof.

The housing bottom part 5 and a pivot device 23 fastened thereto corresponding in terms of their construction substantially to the related components in a backwashing device as disclosed in DE 10 2004 004 756 A1. Presently no need exists to discuss the entirety of the constructive details of the housing bottom part 5 and of the pivot device 23. As in this solution that is provided by the prior art, the bottom part 5 includes an inlet 13 for the fluid that is to be filtered as well as an outlet 15 for the filtered fluid. Located diametrically opposite of the vertical axis 17 relative to the inlet 13, a backwashing outlet 19 is disposed within the housing bottom part 5, by which the backwashing fluid volume can be discharged from the device.

Figure 2:
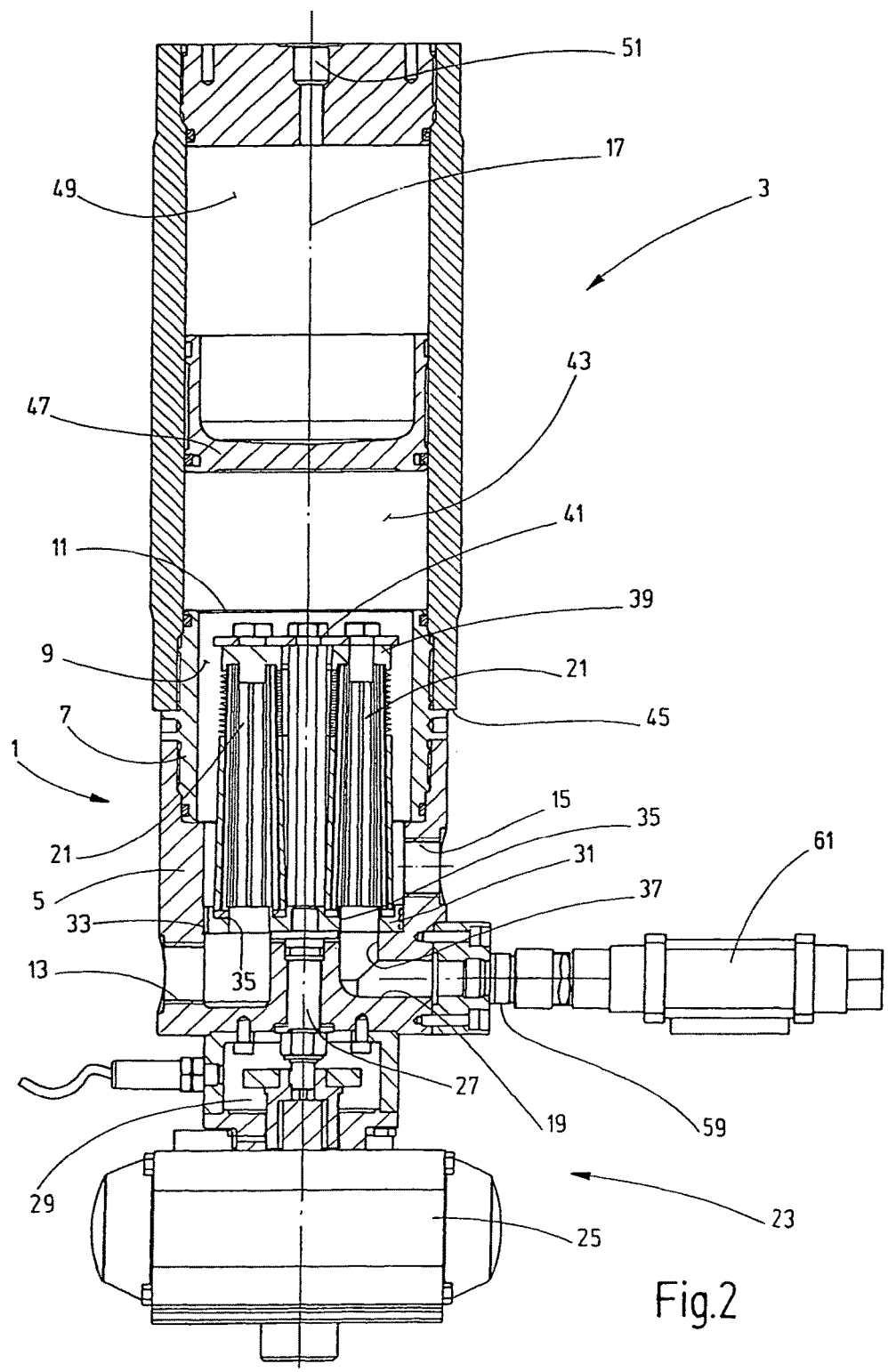
FIG. 2 is a side view in section of a filter housing and the associated storage unit of the exemplary embodiment of the invention.

Tapered filter elements 21 are inserted inside the filter housing 1. At least in part, cylindrical filter elements (not shown) can be used instead of the tapered filter elements 21. The tapered filter elements 21 can be slotted screen tubes that are disposed in groups around the vertical axis 17 at relative distances to each other along the circular arch within the filter housing 1. In one embodied example that is not shown in further detail, the filter elements 21 can also be disposed, divided in groups, along multiple cylindrical arches of the filter elements 21. However, in the embodied example as shown in FIG. 2, a total of four filter elements 21 are disposed, seen from a perspective relative to the vertical axis 17, diametrically opposite each other. Seen from the perspective of FIG. 2, the filter element 21 that is visible on the right side therein is shown in the backwashing position thereof, while the other filter elements 21 are in the filtration position.

As in the known solution (DE 10 2004 004 756 A1) that was mentioned previously, the individual filter elements 21 can be sequentially moved by the pivot device 23, from the filtration position thereof into the backwashing position and back into the filtration position. The rotational movement for the individual filter elements 21 can be clockwise or counterclockwise. The pivot device 23 includes a drive motor 25 (hydraulic or electric) that generates a controlled stepwise rotary movement of a shaft 27 powered by a drive 29 that is connected to the filter support 31. Filter support 31 is guided, rotatably and sealed, by the circular circumference thereof via a sealing apparatus 33 and along the internal wall of the bottom part of the housing 5.

The filter elements 21 are disposed on the filter support 31 such that the internal filter cavity is aligned with the openings 35 in the filter support 31. One of these openings 35 of the filter support 31, respectively, can be aligned with a backwashing opening 37, as demonstrated in FIG. 2 in an exemplary manner by the filter element 21 seen on the right side that is in the backwashing position. The remaining filter elements 21 are in communication with the filter inlet 13 via the openings 35 in the filter support 31, such that fluid can flow into the internal cavity of these filter elements 21 for the filtration operation. The flow has the ability to reach the clean side, meaning the internal chamber 9 of the filter housing 1 from which point the filtrate is discharged by the filter outlet 15. A filter cover 39 is provided as a retainer for the filter elements 21 that are located on the filter support 31. The retainer is screwed to the top end 41 of the drive shaft 27.

The storage unit that is configured as a piston accumulator 3 in the present embodiment is combined in the embodiment as shown here with the filter housing 1 to form a uniform or unitary structural unit. As shown in FIG. 2, the piston accumulator 3 is open at the bottom end 45 thereof as seen in FIG. 2. The cylinder jacket of the piston accumulator 3 crosses by the open end 45 thereof over the open end 11 of the top housing part 7 of the filter housing 1, to which it is screwed forming a seal. Correspondingly, the internal chamber 9 of the filter housing 1 constituting the clean side transitions virtually in a step-less manner into the cylinder chamber 43 of the piston accumulator 3 that forms the fluid side of the storage unit. The working chamber 49 of the piston accumulator 3 that is located on the opposite side of the piston 47 that serves as a movable separating element is closed, except for a pressure connection 51. As shown in FIG. 1. An accumulator valve 53 is connected to the working chamber 49 via the pressure connection 51. The accumulator valve 53 allows supplying the working chamber 49 with an operating gas, as in the present example compressed air supplied by a compressed air line 55, or to lock the pressure connections 51, or, as shown in FIG. 1, to connect the working chamber 49 via the connection 51 to the environment using a filter/choke 57.

When the working chamber 49 is supplied during normal filtration operation with an operating gas (compressed air) that is adjusted to the system pressure of the filter device, the piston accumulator 3 can act in the manner of a pulsation dampener. In this operational state, the backwashing line 59, which is connected to the backwashing outlet 19, is closed by a backwashing valve 61.

To start a backwashing process, the backwashing valve 61 is opened, and the pressure connection 51 of the piston accumulator 3 is connected to the compressed air line 55 by the accumulator valve 53 to maintain the adjusted system pressure in the working chamber 49. Opening the backwashing valve 61 results in the discharge of a backwashing volume of fluid from the filter housing 1, which would, in fact, lead to a collapse or reduction of the volume flow of the filtered filtrate exiting from the outlet 15. Due to system pressure that is present in the working chamber 49 of the piston accumulator 3, the piston accumulator 3 provides a push action, acting as a pump in this situation that pushes a fluid volume out of the cylinder chamber 43 to the clean side 9 (internal chamber 9), whereby any drop in the volume flow of the fluid is avoided during the backwashing operation.

When the backwashing valve 61 is closed after backwashing is complete, the valve 53 connects the working chamber 49 to the environment, such that compressed air escapes in a choked fashion via filter/choke 57 (FIG. 1), until the piston 47 has moved a corresponding upward distance as in FIG. 2. The volume of the cylinder chamber 43 then has the desired value once again, such that, for any subsequent filtration operation with a closed accumulator valve 53, a dampening of the pulsation occurs once again, or a desired resupply volume is available for any subsequent backwashing process with compressed air supply to the working chamber 49.

In the depicted assembly, with a step-less transition of the filter housing 1 into the cylinder chamber 43 of the piston accumulator 3, on the one hand, no loss due to flow resistance between the internal chamber 9 and cylinder chamber 43 results. On the other hand, a compact construction with a sufficiently large volume for embodying the chamber 43 and 49 of the piston accumulator is made possible, wherein the largest value of the volume of the cylinder chamber 43 constituting the fluid side can be substantially greater than the volume of the internal chamber 9 of the filter housing 1 surrounding the filter elements 21.

The pushing or pumping effect of the piston accumulator 3 during the backwashing process does not only prevent a collapse of the volume flow of the filtrate, but it is also beneficial for the efficiency of the filter cleaning operation during the backwashing process.

It is understood that other types of storage units can also be used in place of the envisioned piston accumulator 3. For example other hydro-pneumatic accumulators such as a bladder or diaphragm or bellows accumulator can be used. Instead of the hydro-pneumatic accumulator, a separating element can be moved mechanically instead of pneumatically, for example by mechanically coupling an accumulator piston with a mechanical or electric or hydraulic drive, or by hydraulic pressure that acts upon the separating element.

Using the gas filling system of the accumulator prevents quick filling action of the gas chamber. With the use of a correspondingly adaptable choke circuit, the accumulator can be slowly charged to the pressure level in relation to the fluid of the filter unit. Moreover, the solution according to the invention is characterized in that the gas system or the gas filling system can be operated on a different pressure level than the level that is preset by the pressure level of the fluid filter to compensate for any pressure collapse of pressure fluctuations. Furthermore, the accumulator can be used in the manner of a dampener to smooth out pressure fluctuations in the system as a whole.

The use of correspondingly adapted wire mesh elements, instead of the slotted screen tube elements 21, is also possible. Charging of the accumulator is optionally possible after a complete backwashing cycle, for example, involving all four elements or after backwashing only one element.

While one embodiment has been chosen to illustrate the invention, it will be understood by those skilled in the art that various changes and modifications can be made therein without departing from the scope of the invention as defined in the claims.

The invention claimed is:

1. A filter device, comprising:
a filter housing with a cylindrical internal chamber that is open at a top end of said filter housing and with a vertical axis;
plurality filter elements in said internal chamber of said filter housing separating a clean side from an untreated side in said filter housing, said clean side being defined by said internal chamber of said filter housing surrounding said filter elements, said filter elements being filter cartridges disposed in groups around said vertical axis of said filter housing, said filter cartridges allowing flow in both directions therethrough for filtration and backwashing sequentially such that at least one of said filter elements is backwashed by a backwashing device coupled to said filter housing to clean an effective filter surface of said one of said filter elements while simultaneously other ones of said filter elements receive a flow-through from an inside surface thereof to an outside surface thereof to filter a fluid by said inside surface of said filter elements, said filter elements being pivotable about said vertical axis of said filter housing in sequence by a pivot device having a rotary drive to and from filtration positions and a backwashing position of said filter elements in said filter housing, said filter elements being aligned with a backwashing line of said backwashing device in the backwashing position before being pivoted to one of said filtration positions;
a storage unit being a hydropneumatic pressure accumulator having at least one separating element and being connected on said clean side of said filter housing, said pressure accumulator being a piston accumulator with said separating element being a movable piston separator inside said piston accumulator and dividing said piston accumulator into a working chamber and a pressure chamber, said piston accumulator having a cylinder jacket crossing over and attached to said top end of said filter housing and being disposed coaxially relative to said vertical axis of said filter housing, said working chamber of said piston accumulator being separated from said pressure chamber by said piston separator, said working chamber being connected to a compressed air source, said pressure chamber being connected in fluid communication to said clean side of said filter housing, said internal chamber of said filter housing opening and transitioning into said pressure chamber and forming a fluid side of said piston accumulator;
a backwashing valve inside said backwashing line connected in fluid communication to said inside surface of said one of said filter elements to be backwashed when said backwashing valve is opened for a backwashing process; and
an accumulator valve connected to said working chamber of said piston accumulator and operatively connected to said backwashing valve to trigger said accumulator valve as a function of time and actuation of said backwashing valve to connect alternatively and selectively said working chamber of said piston accumulator to said compressed air source to pressurize said working chamber of said piston accumulator and to a vent to discharge compressed air from said working chamber of said piston accumulator.

2. A filter device according to claim 1 wherein
said inside surface of said filter housing is connected in fluid communication with an untreated fluid inlet in said filter housing.

3. A filter device according to claim 1 wherein
an opening of said internal chamber extends over all of an inside diameter of said filter housing, said pressure chamber of said piston accumulator following immediately after said opening of said internal chamber and having an inside diameter at least as great as said inside diameter of said filter housing.

4. A filter device according to claim 1 wherein
said pressure chamber of said piston accumulator comprises a largest volume thereof at least equal to a volume of said internal chamber of said filter housing that surrounds said filter elements.

5. A filter device according to claim 1 wherein
said filter elements are tapered slotted screen tubes.

6. A filter device according to claim 1 wherein
an open top end of said filter housing opens directly into said pressure chamber.

7. A filter device according to claim 1 wherein
said cylinder jacket and said filter housing are threadedly engaged.

8. A filter device, comprising:
a filter housing with a cylindrical internal chamber that is open at a top end of said filter housing and with a vertical axis;
plurality filter elements in said internal chamber of said filter housing separating a clean side from an untreated side in said filter housing, said clean side being defined by said internal chamber of said filter housing surrounding said filter elements, said filter elements being filter cartridges disposed in groups around said vertical axis of said filter housing, said filter cartridges allowing flow in both directions there through for filtration and backwashing sequentially such that at least one of said filter elements is backwashed by a backwashing device coupled to said filter housing to clean an effective filter surface of said one of said filter elements while simultaneously other ones of said filter elements receive a flow-through from an inside surface thereof to an outside surface thereof to filter a fluid by said inside surface of said filter elements, said filter elements being pivotable about said vertical axis of said filter housing in sequence by pivot device having a rotary drive to and from filtration positions and a backwashing position of said filter elements in said filter housing, said filter elements being aligned with a backwashing line of said backwashing device in the backwashing position before being pivoted to one of said filtration positions;

a hydropneumatic pressure accumulator being connected on said clean side of said filter housing, said pressure accumulator having a movable separator inside said pressure accumulator and dividing said pressure accumulator into a working chamber and a pressure chamber, said pressure accumulator having a cylinder jacket crossing over and attached to said top end of said filter housing and being disposed coaxially relative to said vertical axis of said filter housing, said working chamber of said pressure accumulator being separated from said pressure chamber by said movable separator, said working chamber being connected to a compressed air source, said pressure chamber being connected in fluid communication to said clean side of said filter housing, said internal chamber of said filter housing opening and transitioning into said pressure chamber and forming a fluid side of said pressure accumulator;

a backwashing valve inside said backwashing line connected in fluid communication to said inside surface of said one of said filter elements to be backwashed when said backwashing valve is opened for a backwashing process;

and an accumulator valve connected to said working chamber of said pressure accumulator and operatively connected to said backwashing valve to trigger said accumulator valve as a function of time and actuation of said backwashing valve to connect alternatively and selectively said working chamber of said pressure accumulator to said compressed air source to pressurize said working chamber of said pressure accumulator and to a vent to discharge compressed air from said working chamber of said pressure accumulator.

9. A filter device according to claim 8 wherein said inside surface of said filter housing is connected in fluid communication with an untreated fluid inlet in said filter housing.

10. A filter device according to claim 8 wherein an opening of said internal chamber extends over all of an inside diameter of said filter housing, said pressure chamber of said pressure accumulator following immediately after said opening of said internal chamber and having an inside diameter at least as great as said inside diameter of said filter housing.

11. A filter device according to claim 8 wherein said pressure chamber of said pressure accumulator comprises a largest volume thereof at least equal to a volume of said internal chamber of said filter housing that surrounds said filter elements.

12. A filter device according to claim 8 wherein said filter elements are tapered slotted screen tubes.

13. A filter device according to claim 8 wherein an open top end of said filter housing opens directly into said pressure chamber.

14. A filter device according to claim 8 wherein said cylinder jacket and said filter housing are threadedly engaged.

* * * * *